US011605973B2

(12) United States Patent
Susilo et al.

(10) Patent No.: US 11,605,973 B2
(45) Date of Patent: Mar. 14, 2023

(54) SYSTEMS AND METHODS FOR A WIRELESS SENSOR NETWORK

(71) Applicant: Conectric, LLC, Lewes, DE (US)

(72) Inventors: Ekawahyu Susilo, San Diego, CA (US); Phillip Kopp, San Diego, CA (US)

(73) Assignee: Conectric, LLC, Lewes, DE (US)

( * ) Notice: Subject to any disclaimer, the term of this patent is extended or adjusted under 35 U.S.C. 154(b) by 356 days.

(21) Appl. No.: 16/667,718

(22) Filed: Oct. 29, 2019

(65) Prior Publication Data

US 2020/0136429 A1    Apr. 30, 2020

Related U.S. Application Data

(60) Provisional application No. 62/751,995, filed on Oct. 29, 2018.

(51) Int. Cl.
| | | |
|---|---|---|
| *H02J 13/00* | (2006.01) | |
| *H04L 67/12* | (2022.01) | |
| *H04W 12/06* | (2021.01) | |
| *G05B 15/02* | (2006.01) | |
| *H04L 67/1097* | (2022.01) | |

(52) U.S. Cl.
CPC .......... *H02J 13/0006* (2013.01); *G05B 15/02* (2013.01); *H04L 67/1097* (2013.01); *H04L 67/12* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 9,986,411 | B1* | 5/2018 | Stamatakis | H04L 45/122 |
| 10,778,426 | B1* | 9/2020 | Wolfson | H04L 9/3297 |
| 11,374,779 | B2* | 6/2022 | Sanders | H04L 67/125 |
| 2003/0067889 | A1* | 4/2003 | Petite | G08B 21/18 |
| | | | | 370/310 |
| 2004/0113790 | A1* | 6/2004 | Hamel | G06K 7/10336 |
| | | | | 340/572.1 |
| 2007/0262863 | A1* | 11/2007 | Aritsuka | H04B 17/27 |
| | | | | 370/254 |
| 2008/0055113 | A1* | 3/2008 | Muro | G06Q 10/00 |
| | | | | 340/870.16 |

(Continued)

*Primary Examiner* — Bob A Phunkulh
(74) *Attorney, Agent, or Firm* — Procopio, Cory, Hargreaves & Savitch LLP

(57) ABSTRACT

This disclosure provides systems, method, and computer-readable media for operating a sensor network. The sensor network can include an array of sensor devices and gateways. The sensor devices can sense various conditions of an environment. The sensor devices can include temperature sensors, occupancy detectors, access sensors, motion sensors, tracking devices, etc. The sensor devices can also network and communicate with one another and the gateways in an ad hoc or mesh network. The environment can include different locations, such as warehouse, office building, a complex of buildings, cargo vehicles, containers or the like. The sensor network can be deployed for controlling power consumption, logistics, automated manufacturing, healthcare, intelligent buildings, and smart cities among many other implementations. The sensor devices can communicate sensed conditions and transmit data among each other without a predefined route. When a gateway receives the data, the data can be stored and analyzed at a different location.

6 Claims, 10 Drawing Sheets

(56) References Cited

U.S. PATENT DOCUMENTS

| | | | | |
|---|---|---|---|---|
| 2008/0164997 A1* | 7/2008 | Aritsuka | G01S 5/0009 | 340/539.13 |
| 2009/0122797 A1* | 5/2009 | Thubert | H04W 40/246 | 370/392 |
| 2009/0141741 A1* | 6/2009 | Kim | H04L 67/12 | 370/474 |
| 2010/0008272 A1* | 1/2010 | Messinger | H04Q 9/00 | 370/311 |
| 2010/0118812 A1* | 5/2010 | Kim | H04W 72/082 | 370/329 |
| 2011/0176469 A1* | 7/2011 | Kim | H04W 84/22 | 370/311 |
| 2012/0257555 A1* | 10/2012 | Van Bogaert | H04W 28/06 | 370/310 |
| 2014/0281051 A1* | 9/2014 | Lee | G01D 21/00 | 710/15 |
| 2015/0134801 A1* | 5/2015 | Walley | H04L 41/0893 | 709/223 |
| 2015/0134954 A1* | 5/2015 | Walley | H04L 63/0823 | 713/168 |
| 2015/0278690 A1* | 10/2015 | Bialk | G06Q 10/06 | 702/56 |
| 2016/0135109 A1* | 5/2016 | Hampel | H04W 4/70 | 370/315 |
| 2016/0135242 A1* | 5/2016 | Hampel | H04W 76/14 | 370/329 |
| 2016/0195861 A1* | 7/2016 | Chen | H04L 12/2829 | 700/275 |
| 2018/0063851 A1* | 3/2018 | Abraham | H04W 16/14 | |
| 2018/0190096 A1* | 7/2018 | Lundy | G08B 25/009 | |
| 2019/0036801 A1* | 1/2019 | Natarajan | H04L 67/12 | |
| 2019/0095652 A1* | 3/2019 | Mendez | G06F 21/83 | |
| 2019/0102578 A1* | 4/2019 | Xie | G08B 23/00 | |
| 2019/0207776 A1* | 7/2019 | Wang | H04L 9/3226 | |
| 2020/0005403 A1* | 1/2020 | Patterson | G07F 13/00 | |
| 2020/0136740 A1* | 4/2020 | Gharib | H04J 13/16 | |
| 2020/0136741 A1* | 4/2020 | Gharib | H04J 13/10 | |
| 2022/0217700 A1* | 7/2022 | Takano | H04W 72/046 | |

* cited by examiner

A networked device, Device (i), is associated/linked with a specific device wallet on a blockchain with ID Wallet_ID (i). The Wallet_ID (i) associated with the (i)th device is a unique ID.

Typical contents of a wallet of a sensor/device with Wallet_ID (i).

(A wallet can be also defined and associated with an individual or an entity such as an analytics service provider, e.g., "Analyst Wallet", a transportation service provider, e.g., a "Transporter Wallet".)

SYSTEMS AND METHODS FOR A WIRELESS SENSOR NETWORK

CROSS-REFERENCE TO RELATED APPLICATIONS

This application claims priority to U.S. Provisional Application No. 62/751,995, filed Oct. 29, 2018, entitled "SYSTEMS AND METHODS FOR A WIRELESS SENSOR NETWORK," the disclosure of which is incorporated by reference herein in its entirety.

BACKGROUND

Technical Field

The embodiments described herein are related to wireless sensor networks and more particularly, wireless sensor networks that aggregates a plurality of sensors installed in buildings, such as hotels in order to predict and control energy needs for a building or group of buildings.

Related Art

In order to reliably supply energy to a large, e.g., metropolitan grid, energy suppliers must purchase energy from energy producers; however, due to the inability to reliable store energy on such a large scale, the energy suppliers are constantly trying to predict upcoming energy needs and then purchase the requisite energy at the lowest possible price. These energy markets have become more critically time based, less predictable and more event driven. As a result, these markets have felt pressure to vastly increase the level of granularity and frequency of economic bid activities to maintain a reasonable balance between future and current needs. Markets have moved to shorter and shorter time intervals from days, to hours to minutes. Many markets operate on as little as 5-minute increments. Therefore the need for constant reporting, update and control of energy needs is necessary to allow for an energy supplier or large energy customer to manage their energy requirements so as to ensure the requisite energy is available at the lowest possible price.

Certain characteristics of the hotels and other buildings lend themselves very well to this arbitrage opportunity, mainly due to the cyclical and binary nature of occupancy. There are solutions available to the operators or managers of such buildings for predicting building energy needs, manipulating energy consumption based on real-time occupancy, and the ability to store energy in building structures and aggregate this solution in a manner that leverages sufficient impact on the energy system to drive price arbitrage based revenue streams. All without impacting the utilization, value or comfort of the building itself.

In order to take advantage of this arbitrage opportunity, a solution to wirelessly network hundreds or thousands of sensors in large commercial buildings, such as hotels, is needed so that data could be reported back to a centralized repository, analyzed and aggregated. Unfortunately, conventional wireless sensor networking technologies are not adequate to address all of the requirements needed to leverage available sensor and control state data in order to take advantage of the arbitrage opportunity effectively.

SUMMARY

The proposed solutions make adding wireless sensors to a network very easy and inexpensive. Therefore, sensor networks can be very dynamic in time and they can be implemented in many different locations, e.g., in a warehouse of containers of goods and on trucks that transport those containers, where the containers may be instrumented with various sensors. Logistics is one of the many application areas for sensor networks where other applications include automated manufacturing, healthcare, intelligent buildings, and smart cities. Furthermore, the conditions monitored by sensors may dynamically change, e.g., due to changes in the location or environment of the instrumented objects, thereby requiring corresponding changes in the network and more granular sampling and recording of sensor signals.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

The systems and methods described herein can meet or exceed the performance requirements dictated by not only the hotel/grid energy control system, but also a large portion of the "sensor data" applications in the world today. This market is potentially very large, as estimated to reach Trillions of USD by various analyst reports. In the systems and methods described herein the data from sensor and control states can be implemented into software as a method of automating aggregated groups of buildings ("loads"), thereby impacting grid energy consumption in targeted locations whereby price volatility caused by short supply, high demand or even excess supply in energy imbalance markets, creates the opportunity for arbitrage. The embodiments described below solve the cost, reliability, scalability, throughput, security, privacy issues, and enabling the ease of adding and removing sensors in an open wireless mesh network.

The proposed solutions make adding wireless sensors to a network very easy and inexpensive. Therefore, sensor networks can be very dynamic in time and they can be implemented in many different locations, e.g., in a warehouse of containers of goods and on trucks that transport those containers, where the containers may be instrumented with various sensors. Logistics is one of the many application areas for sensor networks where other applications include automated manufacturing, healthcare, intelligent buildings, and smart cities. Furthermore, the conditions monitored by sensors may dynamically change, e.g., due to changes in the location or environment of the instrumented objects, thereby requiring corresponding changes in the network and more granular sampling and recording of sensor signals.

In the systems and methods described herein, the sensors are easy to install. They can be battery operated and automatically discoverable by the network without the need to configure the network or associated applications. This can be illustrated by the network 100 of FIG. 1. The network 100 can be installed within one or more rooms or buildings, for example. Multiple sensor devices (sensors) 102, 104 can be installed within the building(s) operating the network 100. The sensors 102, 104 can sense various aspects of the environment (see below) or be coupled to devices to measure power consumption, for example. Each of the sensors 102, 104 can have one or more processors or microprocessors (e.g., a central processing unit) configured to execute instructions stored in an onboard memory to perform a task. The sensor devices 102, 104 can have a sensor element operable to sense a desired condition. The sensor devices 102, 104 can further have a transmitter and receiver (e.g., a transceiver) operable to transmit and receive data or other signals and communication from other sensors or gateways.

Figure 1:
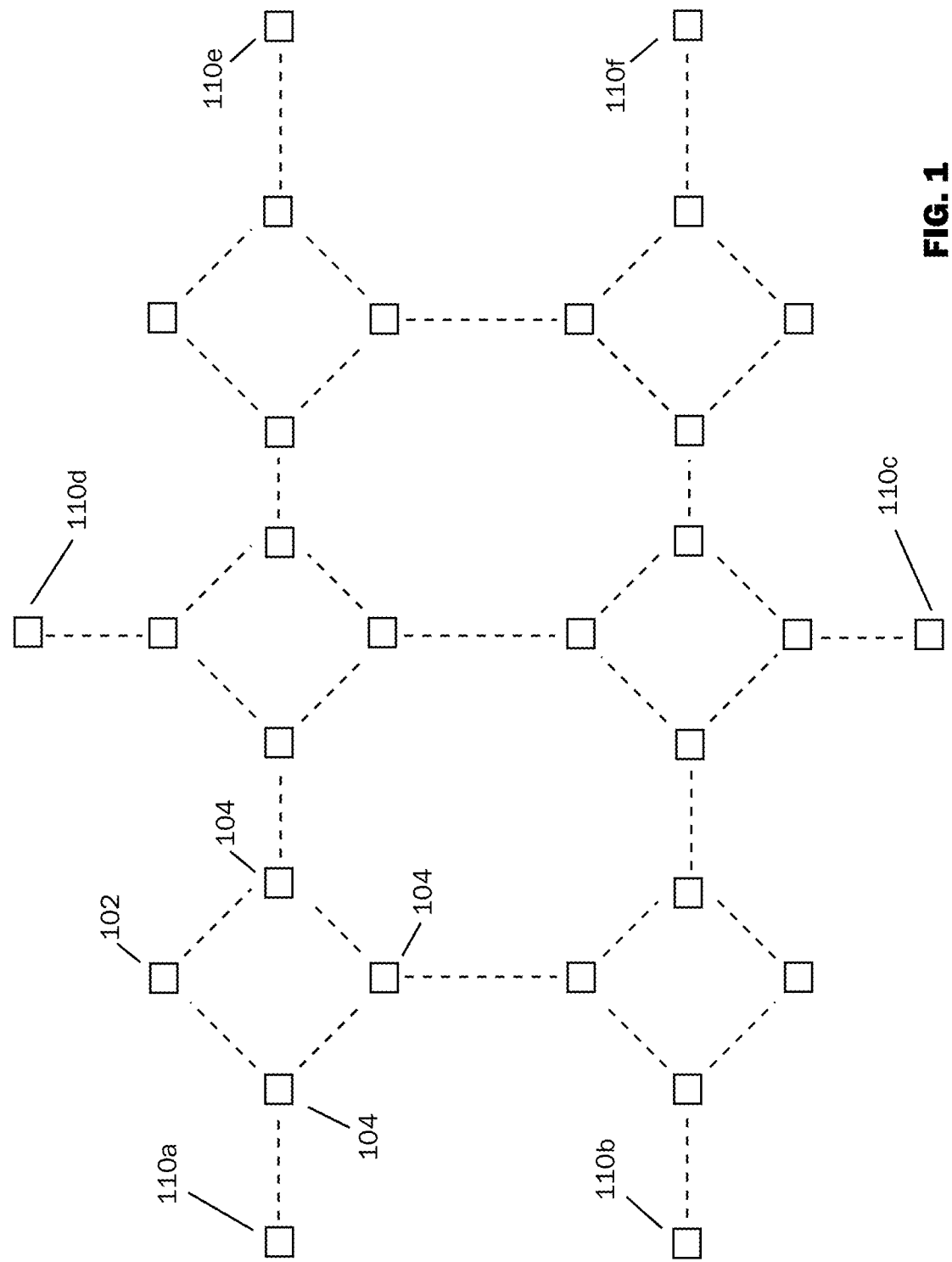
FIG. 1 is a diagram illustrating an example network according to one embodiment.

When a sensor 102 is added to the network, the sensor simply identifies other sensors 104 or gateways 110 within its range. Six gateways are shown in FIG. 1 and labeled 110a, 110b, 110c, 110d, 110e, 110f. Each of the gateways 110 can have one or more processors or microprocessors (e.g., a central processing unit) configured to execute instructions stored in an onboard memory to perform a task. The gateways 110 can have can further have a transmitter and receiver (e.g., a transceiver) operable to transmit and receive data or other signals and communication from the sensors 102, 104.

When sensor 102 has data to send, it can simply send it to any available sensor 104 nearby and that sensor will then forward it to any other available sensor, and so on. Thus, there is no need to pre-determine routing and no need to remap routes when a sensor is added.

Eventually the data will reach a gateway 110, or sink that will interface the data or message with another network, e.g., in another building, or with an application as described below. In order to ensure the data does not endlessly bounce around network 100, each sensor can be programmed such that if it sees a message a second time, it will send it to a different sensor 104 than the last time.

Thus, each of several buildings, e.g., in a city or on a campus can be quickly fitted with sensors of various types, e.g., temperature sensors, occupancy detectors, access sensors, etc., to create the network 100. Each of these networks can then be joined to form an even larger network. Ultimately one or more gateways can be interfaced with the network(s) to gather the data and make it available to one or more applications and to store the data. As described below, the data can be added to a blockchain.

In system 100, sensors 104 can comprise both a sensor(s) and a router. Likewise a gateway 110 can act as a router or a sink; however, it cannot be both a router and a sink. The system needs routers. The router is important because it/they is/are the one(s) that is constantly updating the active sinks, nearby sensors and other nearby routers so that sensors do not have to maintain routing schedules. Thus, the system can comprise "standalone" routers not shown in FIG. 1, but described below.

First, it is important to understand the network and system requirements needed to address the opportunity described above. These requirements include requirements related to installation that allow for the sensors to be deployed, e.g., in a hotel or other busy building environment. This requires that the sensors be easy to install, e.g., while hotel rooms are being serviced by housekeeping (<30 minutes per room). The sensors also should not be wired and should be battery powered. Sensors must be installable on an ad-hoc basis where there is no network present at the time of installation, as the availability of rooms is not known by installers until the day of installation and it is not structured. The network must be able to reach the sensor and the sensor must be able to authenticate in the network on its own without requiring the presence of a human installer ("auto-commissioning")

Sensors should have at least a 5-10+ year operating battery life in real world conditions and must be small enough to be discreetly installed. It most embodiments, it is better if the sensors are not powered by solar panels.

The sensors should leverage a common software architecture so that the same base system can be easily applied to a large array of sensor types, drivers and applications. Further the sensors, should be able to transmit based on three modes of communication at a very high frequency and low latency such that reaction to sensor activity is unnoticeable to an occupant (as little as 300 ms for the control to react to the sensor activity): 1. Scheduled intervals; 2. upon activity (motion or door opening); and 3. based on request and reply.

Sensors should be able to communicate to localized hubs with distributed intelligence (thermostat or VAV controllers), that can leverage, e.g., occupancy algorithms and other smart algorithms without depending on a central authority in the case of a network or communication failure. Ideally, thousands of sensors must be able to communicate in a very dense environment, including up to hundreds of sensors or more in a single room (or unit).

Sensors should communicate with 100% performance, no sensor data packet may be lost (treated as "mission critical" 9 9's performance requirement). The sensors should also work in a mesh network of up to hundreds of nodes such that a very large hotel could relay information back to a repository for data storage, and analysis (up to 500 nodes per "gateway" device).

The network should be self-healing such that missing nodes would not compromise the 100% data quality performance requirement and that sensor data could be routed through alternative nodes in order to ensure complete acquisition. The network must be manageable, repairable and installable by non-technical non-IT people without strong background in software, networking, or technology (<$15 hr. labor class, i.e. untrained, high turnover hotel maintenance staff). Further, the network must be highly dynamic and capable of maintaining the 100% data quality requirement under highly variable conditions, large groups of people, substantial jamming interference from parallel networks, including wi-fi and other unpredictable situations.

Still further, the network must be capable of handling very large data packets, up to 512 Bytes each that are sent via highly sophisticated energy metering and analysis sensors.

The energy data should be acquired in under four second intervals such that the data may be used to participate in power frequency regulation markets through the response and control of rotating electric motors, variable frequency drives or energy storage means.

The network must be expandable across buildings, such that large campuses of buildings ("resorts") may be networked together and data can be acquired from remote locations. The need to communicate between buildings means the wireless systems must be able to communicate up to hundreds of feet range. The network must not depend on the internet or any outside communication, it should be capable of being 100% private and contained on site, as well as cloud connected.

In the case of interruption of cloud connectivity, the network must be able to join neighbor networks that belong to disparate building clusters or parties such that grid balancing activity may be autonomously operating and self-balancing without external influence or control, managed by data generated within the networks and networks of networks.

The system must be able to operate completely autonomously without centralized instructions in the case of interruption to cloud connectivity as not to impede the use of the building. The networks must be secure such that hackers or bad actors cannot modify the network characteristics, steal information, inject false information into the network or maliciously control the networks in a way that disrupts the building operations or provides access to sensitive information, or other data stores.

Network owners or operators must be able to acquire new components or build on the network hardware in a non-proprietary model in the future (building maintenance goes to typical home improvement store, buys a replacement part and installs it, or wants a new sensor data and installs it). Disparate hardware systems must be able to be integrated across the networks such that the network is leveraged in a non-vertical, horizontal application, i.e. the ability to operate multiple systems across a single network.

Key example in hotel buildings is the need for separate systems for room automation, HVAC systems, lighting control, room networking, lock/security access control systems. Conventional approaches require completely redundant installation of separate networks for each of these various applications, which is very cost inefficient and technically challenging to install, operate and maintain.

The networks must be able to capture data from a wide array of 3rd party hardware manufacturers such as Honeywell, Siemens etc. The networks must be able to capture data from a wide variety of existing installed sensors and systems, and/or feed or capture data from existing systems in parallel to augment and improve the overall controllability of the buildings.

The system must have a very low cost to produce, such that the period of cost recovery from energy value derived revenue is not excessively long and can be reasonably financed at a low cost. The system cost should also be based on a positive return on investment based on the maximum amount of energy savings achievable. The system must have a very low cost to install for much the same reason, i.e. the core cost driver would not be the hardware cost, nor the installation cost, but the "total cost of ownership" from the first day to the last day of operation.

The system must be easily removable and re-installable in different locations such that its operation can be underwritten as a service contract in the case of a service contract it can be easily removed without substantial disruption or damages to the installed premises and its depreciated value may be captured by re-installation into other premises. The system must be durable in a commercial environment with hostile users.

Presently, Wifi or cellular technology cannot be used for connectivity because the protocols require too much power. Further, Bluetooth, Wifi or ZigBee cannot presently be used for connectivity because they cannot meet the range and reliability requirement. The need to operate without a central authority eliminates the possibility of cellular, narrow band cellular, or proprietary wide area IoT networks (Sigfox, Semtec LoRaWAN, etc.). The ability to commission ad-hoc, unstructured and dynamic networks eliminates the ability to use Wifi, Bluetooth or ZigBee technologies. The mesh networking and cost requirement eliminates the ability to use Zwave and Wifi. The data payload and low latency requirement eliminates the possibility of using narrow band cellular, proprietary IoT, ZigBee or IPv6 based protocols such as Thread. The need for low skilled installation and operation eliminates virtually all technologies.

Thus, at present, conventional protocols are insufficient.

There presently exists an Open Source project called Contiki and its commercial IPv6 ("6LoWPAN" in industry jargon) derivation Thingsquare. Initially, the Contiki protocol and embedded operating system was based on a networking stack developed by University researchers called RIME. The RIME stack comes closest to meeting the performance requirements. Early testing however yielded poor results. Many of the theoretical capabilities of the IPv6 over RIME were not achieved in field trials. During development the Contiki organization forked to a new networking stack that abandoned the RIME protocol and centered once again on IPv6, also known as Contiki-NG.

Testing revealed several key issues with conventional protocols. First, conventional mesh networking protocols typically require an inherent network signaling and route building. Further, a broadcasting strategy is used to push messages into the network or request messages from specific devices in the network in order to reduce the number of messages in flight at any given time. This reduces the possibilities of messages "collisions" happening in networks operating in the same frequency bands. When a message collision happens the message data is lost. The network has no way of knowing where this happened.

Another issue is that most conventional protocols use an authentication algorithm that would require the rebroadcast of a message request if the initial request goes unanswered. This severely limits network scalability as very large networks experience frequent and unpredictable collisions and the more re-requests and broadcasts are needed the higher the probability of collisions becomes. This creates a "death spiral" where the network effectively begins to attack itself. Other limitations include very low data cycle frequency, again to limit the number of messages traveling through the network. Constant re-broadcasting also means that sensors must be listening for acknowledgments and prolonged receive activation dramatically reduces battery life.

Route building is another issue that plagues conventional protocols and systems. Route Building means that sensors must build a list of potential neighbors that can receive and rebroadcast messages and an ideal "path" of neighbors and parents that leads back to the final destination, pushing the message forward through the network. This requires that all sensors store this information and that the network is able to enter a "commissioning mode" such that sample messages are sent across the network building a "list" of sensor ID's to form the route. This is severely limiting scalability because small networking devices do not have enough resources like the memory or processing power to store and calculate large tables of route combinations. They are limited to a small number of neighbors each and networks are typically recommended to be under 128 nodes. If the routing tables become too big nodes can become confused or improperly route messages. The network cannot transmit normal messages during route discovery as a master list of all the routes is then stored by a network leader. Even though the mesh network is more robust than a point to point, or star network, it is highly susceptible to failure if either the coordinator is eliminated or some point in the network routing fails and a particular node is unable to pass the message to a neighbor in its existing routing table. This creates a chain effect and impacts all previous nodes in the routing schema. In order to build the routing table, the coordinator must enter a commissioning mode to send out the route building request, learn the sensor path which it can use to request information from a specific sensor (message broadcast strategy), during which time the network cannot be transmitting standard messages (or is effectively disabled).

Furthermore, the network requires that it must enter commissioning mode if any new router, node or sensor joins the network or is removed from the network as this will impact the function of the routing table and all parents or children in front of, or behind the newly joined or removed node. Because commissioning mode causes a network disruption, it must be overseen by a technical professional to ensure that it is functioning properly when re-commissioned.

In practical application these strategies have proven untenable, are very challenging to install, maintain and operate and a sacrifice in message reliability is often made. The expectation is simply that messages will not arrive sometimes due to network collisions or disruptions in the routing scheme caused by changes in actual conditions (people move, cars move, furniture moves, weather changes, etc.). Conventional mesh networks often only work shortly after installation and commonly begin to fail over time due to changes in wireless conditions that render the previous routing schema ineffective.

Conventional star networks are simply impractical due to the high-power requirement to transmit long distances reliably. Even high-powered star networks, such as cellular network have constant reliability issues and data loss.

Long Range IoT networks based on licensed spectrum (NB-IoT) and unlicensed or proprietary protocols (Sigfox, LoRa) require a central authority to authenticate a new device to join the network. They are built around a subscription model that requires network permission to persistently provide data to the network always receives the data prior to handing off to the user application. This poses substantial issues around security risk and makes cost sensitive business models challenging.

Several these standard approaches were used in testing of protocols and the IPv6 over RIME implementations and it was determined in all cases that reliability was not acceptable.

To resolve these issues and over a series of experiments and modifications to the RIME protocol it was eventually determined that a combination of attributes that was able to achieve the desired specifications for latency, throughput, message size, reliability and ease of installation can be achieved as described below with respect to various embodiments.

First, in certain embodiments, the RIME stack was modified to certain attributes in the system OS, sensor driver and networking stack. The attributes include the use of a combination of 4 bytes of logical channel and 2 bytes of short addresses to reach sensor nodes by means of multicast, anycast, and unicast request/response and network signaling. Further, the 802.15.4 standard is found in the physical layer (PHY) of the chipset designed for ZigBee applications. Within the IEEE standard the message header forces the message to follow a Private Area Network (PAN) ID that is designed to separate different networks into "clusters." In the embodiments described herein, a non-standard function in the upper layer header is implemented to allow the message to traverse the 2 bytes PAN (Private Area Network) ID while maintaining its original ID value. It is not a requirement that a network router carry the same PAN ID in order to pass the message.

Still further, multi-hop function sets routers are configured to listen for any incoming messages and rebroadcast the message to all available neighbors. A typical multi-hop implementation requires a route discovery ping while in commissioning mode. The embodiments described herein use an alternative route discovery as described below that does not occur in a commissioning mode.

When testing the existing route discovery algorithm within RIME stack under the network simulation software, it was quite successful; however, when implemented in the field, a large number of packet losses were detected as the dynamic conditions change and the previously acquired route becomes ineffective, requiring a frequent update of routing table. Thus, in the multi-hop implementation described herein, each router keeps data sinks table updated every second and drops inactive data sink from the list automatically when it does not hear from it for more than 150 seconds. All incoming messages are sent towards the closest data sink. This reduces network bandwidth usage by sending the message across the shortest path.

A neighbor table on each router can be updated every second or whenever the router receives boot messages, keep alive messages, and other status messages. Routers drop any neighbor from the list when it does not hear from it for more than the interval time provided in the aforementioned messages.

There is no leader or coordinator present on the network to obtain no-single point of failure. The network route will depend on the combination of all available routers at the time of message broadcast, but no one router has the entire path. This is unlike ZigBee or Thread, in which the removal of the network leader will render the network inoperable. Thread has attempted a solution to this problem and it is a known problem, by allowing the network to elect a new leader if the previous leader has become inoperable. While solving the problem in theory, this presents a new problem during implementation, which is how to decide which device will become the new leader. The network still requires an authority to select the new leader as it can be unknown which device would be the leader with the lowest probability of future failure. In practice, the network becomes confused. This leads to the additional issue of requiring the new leader to perform a route discovery and acquire the new routing table at the time of election.

The embodiments described herein provide a configuration that allows the number of message re-broadcasts to be set or defined as 255 hops maximum. But there is no limitation as to the number of hops a message can travel when the maximum hop number is set to zero. To prevent a message loop, the network will drop any aging message through its timestamp. Other implementations limit the number of hops because they are calculated based on a pre-determined/discovered route and the algorithm attempts to select the route within the maximum value only.

A bursting technique is required for reliable message receipt in a low power and lossy network. The bursting technique sends the same message multiple times in succession using a time randomization algorithm so that the message transmissions are properly spaced. This allows very low powered messages to penetrate below the noise floor as there are gaps, even in highly saturated wireless energy. By bursting this increases the probability that a message will penetrate the gap in noise dramatically. This is akin to multiplying the energy level of the message, without increasing the individual radiation beyond legal limits set for low powered transmissions. Additionally, it dramatically increases the probability of a message receipt in the case that a message collision occurs during flight. For example, if a message collides it is gone; however, in the burst scenario there are multiple messages following it. Thus, in order for the message to be lost, all messages from the burst would have to collide.

The burst further allows the installation of many sensors in a small area. Sensor installations are traditionally limited to 1 or possibly 2 devices per area/zone and manufacturers and vendors have gone to extreme lengths to try and "combine" many sensor functions into a single package and single message frame to avoid having multiple sensors transmitting in the same area on the same frequency as the probability of a local collision is high if the sensors should transmit at the same time or sensors in adjacent zones transmit at the same time. This limits the functionality of the sensor as its mounting location is often compromised to facilitate the packaging. For example, a hotel sensor application dictates that the probability in accurately determining occupancy is dramatically increased by using multiple sensor inputs, thus many sensors should be installed in a small area in such applications, which may be prone to wireless collisions. The burst algorithm resolves this issue.

Typical low powered wireless protocols like ZigBee or Thread do not use a burst but they have message resending method that is based-on an acknowledged unicast. The nature of unicast resending tends to send a message multiple times to a single receiver until it gets acknowledged. The sender then will declare the loss of parent after several retries has failed and it has to find a new parent to forward its message. This has two disadvantages. Firstly, unicast messaging with acknowledgement doubles bandwidth usage. if the initial unicast does not reach an available router, the sender must retransmit until it reaches the router and receives and acknowledgement. Second, if the sender is a sleepy device, then it spends twice energy or more to get the message through. Due to a very high probability that a single message may not reach the recipient, may collide or be corrupted by obstructions this further necessitates a higher power output. For this reason most ZigBee and Thread devices, including very end devices must be constantly powered, dramatically eroding the value of the low powered nature of the network or making it expensive to install. Most ZigBee installations are still only performed in new building constructions and not retrofits, due to these constraints. With the added power requirements and if the message is continuously rebroadcast due to failed acknowledgements, this has the opposite effect of reducing the traffic and actually increases the amount of erroneous messages traveling in the airspace and further increases the chances of packet collisions, and a high likely hood of missing or lost data. To counter this data transmission cycles or intervals are often reduced substantially to once every 10 minutes or more, leading to substantially reduced data granularity and therefore reduced value.

In the context of energy data, if the market requires 4 second response or more typically 5 to 15 minutes response, a data transmission interval exceeding these requirements would result in an unusable solution. Conectric has tested it's networks up to the multiple bursts per second interval without data loss and is therefore highly differentiated.

Curiously, the new "Bluetooth Mesh" standard has implemented messaging flooding with burst and is apparently the first widely publicized standards based protocol that has done so. The Bluetooth Mesh is a standalone implementation that is totally separate from any existing Bluetooth protocol. Bluetooth devices wish to join Bluetooth Mesh have to get connected to a proxy that acts as network bridge.

The embodiments described herein, on the other hand implement an algorithm in the routers such that only the number of messages copies that are received, are passed through the router multi-hop. For example, if a burst of 5 messages is broadcast by a sensor and the router only receives 3 messages due to collisions, the router will rebroadcast the three messages. If the second router receives 2 out of the 3 messages it will rebroadcast 2 messages. This serves two purposes. First, it allows the initially broadcasting sensor to broadcast at a lower power, as the burst must only reach the first router. Once the burst has reached the router the router may broadcast at a higher power level, with fewer bursts (or possibly the same amount of total energy in the air). This allows the broadcasting sensor to have a higher probability of messages success even at low power to reach the first router. It also means that the amount of energy is reduced as the message is passed through the network. The bursts and energy are optimized such that it can be guaranteed the final designation will always receive at least 1 or more packets, or 100% reliability.

A router may be set as a sink. This designates the router as the endpoint for all data traveling through the network. Only the sink will not re-broadcast a message to its neighboring router. Eventually all messages will pass through the network and arrive at a sink. Once they arrive at a sink they will be removed from the air.

It is possible to have multiple sinks. Because the network is unstructured a given message may arrive at any given sink. By adding more sinks it is possible to add more bandwidth and more routers, as it will reduce the number of rebroadcasts within the network. This has the effect of enabling virtually unlimited bandwidth, even in a very low power network.

Because the sink is the only determination of whether a message should continue to be re-broadcast or removed from the network it means that the sensor does not need to know the identity of the sink and the sink does not need to know the identity of the sensor. It simply needs to know if the sensor belongs to the right cluster in order to decide whether to accept the message and treat it for another activity. This makes installation very easy and eliminates the need for a network leader.

A sink or a router can be configured to only accept messages from a specific cluster (identified by a configurable PAN ID), in order to create network separation or privacy. It does not have to be set to a specific cluster however, allowing messages to traverse networks of different PAN ID's. This allows the size of the network to be infinitely expandable or leverage a same set of infrastructure across multiple applications or uses, without risking the wrong information provided to the wrong application.

Because the energy link between a sensor broadcast and a router can be very low or limited, it means that the battery life of the sensor can be very long. It also means that many sensors can be installed in a small area as many high powered sensors, attempting to transmit over long distances mean that the sensor density is reduced by the probability of neighboring sensor message collisions.

Router implementations can be constant powered, making the network a hybrid of battery and powered devices. This is because the routers should always be listening for potential messages to pass on and the radio receiver will consume ample power. This has the effect of reducing the power needed by the broadcasting sensor by increasing the chances of reception, even at a low power. Also, it is possible to install or package the router function in devices that are commonly constantly powered, such as room thermostats, lighting fixtures, energy meters or plugged into wall outlets. Thus, certain embodiments include a hybrid battery and line powered network providing optimal performance.

There is large market demand for low powered routers, such that they may be field installed in areas where power is not available, such as open-air country or very large industrial spaces. Currently the power consumption is not optimized to be battery powered. Thus, certain embodiments can include a battery powered router by utilizing a crystal oscillator to synchronize a network clock. With a finitely synchronized network clock, it is possible to implement a routing algorithm in which a known timing is used to initiate a message broadcast. Routers turn on the receiver and listen for messages according to the predetermined time schedule. When a message is received by a router, it may be stored in flash memory and retransmitted during the next broadcast interval until it reaches the sink.

Certain embodiments, also implement a second broadcast type for device protocols based on a Master Slave concept, which are common to building automation systems. Typically a Master device will send out a request with a specific device identifier contained in the message header. The intended slave recipient would receive the message and send back a message acknowledging its receipt (similar to the acknowledgement broadcasting scheme described above for ZigBee and Thread type protocols). This is useful to allow a device (or multiple devices) that is already installed in a wired building automation network, and that does not speak the protocol described herein, to be communicated with over the wireless network. A common example of such protocols would follow the RS485 serial communication or MODBUS protocol standard.

The message request can be sent out by the Master in the same way as described above, noting that a unique address is used to identify the intended recipient and not solely the sink designation. Embodiments described herein can use either the MAC ID of the receiving device or a unique serial number assigned to the device. This means that the message may be able to find a unique device without specifying which router or hub it is attached to (allowing for the unstructured routing scheme).

Once the unique device receives the request it will respond through the network, using the device MAC ID to perform the routing function. Rather than re-broadcasting the response through the entire network, the response can be made more efficient by following the same specific path that it traveled to arrive during the message request, effectively creating a "temporary" routing table that is specific to that message. In this way it is the responder who carries the routing table and not the network leader (any responder is temporarily considered a leader, even if it is a slave device). This is the complete opposite proposal compared to what existing popular route-based mesh protocols utilize. The probability that the same path will be valid momentarily after receiving the message is much higher than sometime later when conditions may change substantially.

If the Master does not receive the response back, it will resend the same request according to the initial broadcast algorithm, rather than the slave resending the message again automatically or creating double duty by having to wait for an acknowledgement of receipt from the initial sender. This also inherently follows the random or dynamic routing nature, even though the return path is based on a fixed route, as the second request may follow a different routing path to arrive at the Slave than the first request, due to changing conditions.

This feature enables the poll chunk request broadcast algorithm, and allows the network to receive very large messages payloads over the network from devices, which produce large data packages. This is necessary because the smart energy metering devices that must be polled for hotel and grid control software, only send a single large package of data, which exceeds the capacity of the limited payload for each low powered message.

The poll chunk request is sent from the Master to the Slave. When the Slave receives the request it will respond in the same way as described above, however the response will not include the entire message, it will include instructions with the expected reply message size and the number of messages that would be needed to carry the entire reply broken apart into multiple payloads. Each payload can contain a common identifier that it belongs to the same message, but belongs to a "chunk" that is to be reassembled in specific order to complete the entire message body, regardless of which order the chunks are received by the requestor. The reply messages will each be sent back by the Slave. If the Master does not receive a specific chunk reply based on its expectation, it will then send a new request, however it will only send a new request for the specific chunk that is missing or corrupted. This dramatically reduces the number of re-requests needed to complete the very large message body.

Sometimes messages may arrive according to the request but are not complete or are corrupted throughout the transmission process. The poll chunk function can be configured to only accept messages that have been CRC checked for completeness such that a single corrupted chunk would not compromise the data of the fully reassembled messages.

Devices within the network can be configured to send a supervisory message according to a regular interval which does not include any sensor payload, but confirms the presence of the sensor in the network. This can be used as a means to manage the network or notify the presence of a new sensors or removal of an existing sensor.

The described network is considered an open network in the sense that new routing nodes and new sensors can be added and begin broadcasting without a network key, as long as the preamble, physical channel (frequency band), logical channel (software defined channel) and possibly PAN ID (depending on the configuration) match. Changing the logical channel or PAN ID (both functions of the 802.15.4 standard) would normally disallow data from being routed or accepted by the sink; however, they would continue to broadcast and occupy bandwidth and may prevent data from other acceptable sensors from propagating through the network. This network configuration is effectively a non-commissioned or non-managed network in the sense that any new device may be added or removed at any time, without any central authority or need to communicate through a third party.

There may be applications where a completely open network is not desired due to security or privacy concerns. In this case the network should be configurable such that devices must be permissioned to access the network. This is typically done through a commissioning software during commissioning mode, in which a new sensor would be discovered during a route discovery ping and the network manager or commissioner would confirm the sensor validity. It can also be done using a network key or passphrase, in which a private key is requested by the network in order to join the network. This presents several challenges, as it means that there must be a centrally trusted authority to store the private keys, that the entire network would be compromised if the private key is lost or stolen and that each sensor has an interface means for the sensor installer to enter the private key. This makes adding or removing sensors very challenging, risky and may require highly trusted authorities with substantial responsibility to store the keys or highly technical labor to perform the system commissioning. None of which meet the, e.g., hotel network requirement.

To address the various security disadvantages of a completely open network, certain embodiments can implement a "hardware key," just like the key to your traditional doorlock. The hardware key is a node that can be programmed with the secure private key, which will grant access to the network. In addition to the private key, the hardware key will contain the network configurations which would coincide with the necessary preamble, channel, physical channel, logical channel and PAN ID which are all software configurable in any new sensor. Any new device must be in the physical presence of the hardware key to join the network and "learn" the configuration of the network. This would make it very difficult for a malicious actor to join the network as physical presence is required.

Also, it would be very challenging to guess all of the correct network configurations even if the bad actor was able to gain physical access to the network. Because the wireless messages are encrypted by the encryption co-processor in the SoC hardware, it would not be possible for a physically present bad actor to sniff the network to determine the configurations and spoof the network. It would be necessary to guess a 2B (short ID)×2B (logical channel)×2B (encryption key) combination (around 281 Trillion combinations). Having the network key and configurations stored in a physical hardware device also eliminates the need to confirm the network authentication with a remote server or cloud server as is standard practice and allows the continuation of a completely decentralized, autonomous network model, while still being secure.

To add a further layer of security, the network key can be stored in a Write Once Only memory on the sensor. This would permanently bind the sensor to that network only and it would not be transferable to any other network. You would have to destroy the sensor if you wanted to remove the memory chip and install a new one. While this is impractical if one wanted to remove a sensor from a network to reuse it, it would be a highly secure solution in applications where this wasn't an inherent requirement. The use of write once memory is not common in electronic designs.

Block chain software can also be used in certain embodiments, integration for authentication purposes. Although this requires a node to be synced with the blockchain, and that blockchain can act as a centralized authority, the blockchain can be cloned across many nodes and thus maintain its integrity in a decentralized fashion. In this security application each unique sensor ID can be written into the blockchain during the production process and all synced blockchain nodes can be updated to include the new sensor ID in a public or privately hosted environment. When the new sensor is added to the network, instead of relying on the hardware key, its ID is relayed through the network using a special authentication message that will eventually reach a synced blockchain node. The blockchain node can validate the sensors ID as valid, and relay an authentication key message back to the sensor confirming acceptance to the network. This can work under the similar protocol as used in the request response or poll chunk protocols. Without this acceptance the sensor, immediate neighbors will not continue to re-transmit sensor data.

The acceptance key can be further obfuscated through a poll chunk system in which multiple messages would be reassembled, adding further difficulty for a bad actor to duplicate the process. This can make it nearly impossible to interact with the network without the blockchain validation and provides an easier commissioning process for the user as it is fully automated on the block chain software and eliminates the need of having a physical hardware key. All the user need is simply to have a sensor that is compatible with the current blockchain iteration.

It can also be possible to add an additional layer of security by combining the need of the hardware key and the blockchain node for further security.

The blockchain issued key can also be store on Write Once memory to add continuity to the immutable nature of the blockchain software, such that once the sensor is validated and the network key is stored in the write once memory, an acknowledgement is sent back to the blockchain that the sensor is activated, which would make that sensor permanently bound to the blockchain, rendering one completely useless without the other.

Certain embodiments can include a commissioning app, in which the hardware key could be written as a piece of software for use on, e.g., a smart phone or tablet. In this way the "hardware key" is actually ones smart device, as opposed to a specific piece of proprietary or bespoke hardware. This could be thought of in a parallel fashion as to the difference between a standard metal door key, versus a Bluetooth enabled digital app key used for a doorlock.

Additionally, there are upper application layers and drivers that can be added on top of the networking stack. For example, the SoC can communicate over a UART or SPI pin to an external sensor reading A/D converter. A sensor manufacturer may have a development kit available to allow writing a driver that allows the SoC to communicate with, control and acquire data from the specific sensor device. This allows significant flexibility in the software design as a custom driver or the sensor manufacturer supplied driver can be embedded into the OS stack to read the required sensor states. In this way a single software stack can be made to work with very many different kinds of sensor devices, all that is needed to flash the new sensor driver into the stack.

Several driver interfaces can be implemented to work with various sensors as required by, e.g., the hotel automation system or IoT market. These include reading state switches, Passive Infrared Motion sensors, temperature and humidity sensors, 3v pulse sensors, and RS485 networks. In the future the driver library could be expanded to read many new sensor types or packages. The sensor drivers can be further modified or customized to manage the sensors behavior, electric energy consumption, data acquisition rate, etc.

A further upper application layer can be added, depending on the embodiment, to the embedded OS that provides specific, custom instructions, variable configurations, network management and even relatively advanced algorithms, distributed down to the individual device level. For example, sensors can include applications that allow one-to-one or one-to-many interactions, such that data transactions can be shared across sensors, without being routed through the network to the sink.

Certain embodiments can include a thermostat control application that is able to read and control commands locally over a MODBUS protocol so that, for example an ideal temperature setpoint register value may be compared against a temperature sensor reading. A relay switch state driving a fan motor operation or a cooling loop, can process this information and effect a control algorithm to change the state depending on the variable conditions. These algorithms can become quite advanced referring to historical readings statistics ("machine learning"), tables, charts or even information acquired from remote devices over the network (such as the current reading of an energy meter).

Because these application and driver layers are specific to devices and end uses, but may need to be updated over time as conditions change, new information is learned or improvements are put into production, the devices need a way to check if they have the most current drivers and applications available or if they need to be updated. This need is further exemplified in the open network model, where a new device may have a more current set of configurations or drivers than its peers in the network which were installed at a prior date revision. This is further exemplified if the network itself is not connected to a cloud service or is a private or local network that is not able to otherwise verify if its current applications or drivers are up to date.

To resolve the above stated problem we have come up with a solution such that if a new device is brought into the network, its software revision can be checked against similar devices within the network. A temperature driver can be checked against another temperature driver or a router can be checked against another router. The device with the most current driver or software revision can provide the outdated device with a copy of the new software and the outdated device can store the new software in its flash memory. The device can then automatically update its software and restart itself to the latest version. This way the network can be automatically updated and configured to the latest software version so that all devices within the network carry the same version, features and compatibility.

This function can also be added to the hardware key, such that the latest software versions for all available driver libraries could be added to the network using the hardware key. This is due to the fact that the software code can be disseminated using the various broadcast or poll chunk protocols and replicated onto the sensor flash memory. This allows updating all network software securely, based on physical presence, without the need for remote, cloud or internet connectivity. This could of course also be done on a cloud or server connected network, in which case an authenticated user connected to the network and the cloud, would be able to push an update to all the sensors.

Traditional IoT networks and proprietary networks such as NB-IoT, Sigfox and LoRa have a major problem with the updating, because it takes all of the network bandwidth, severely limiting the real data across the network while this is happening and can effectively disable the network for an extended period of time. This problem is solved in the embodiments described herein by sending updates across the network and storing it in the secondary location of flash memory on the SoC, so that it can be updated at a later time as not to interfere with the data integrity. A second authentication message can be sent to notify the sensor when to update its software at any time.

Using the PAN ID function, a network configured as described herein can also configure clusters of networks within networks that target specific types of sensors, groups of sensors or geographic confines within the network. For example, the sink can request sensor data from a specific cluster of temperature sensors only, or energy sensors only, or a specific floor on a hotel room only. Similar to the function of the Master Slave protocols, this enables all sensors within the network to communicate bi-directionally. Because this function requires the radio to be listening for requests it is not practical for purposes of long battery life. A crystal oscillator can also be used so that the network can be coordinated to receive requests at a pre-determined time sync. This is useful for the remote updating of network settings or software.

Most IoT solutions access data across the network through a piece of hardware called the Gateway. The gateway has a radio hardware and software compatible with the physical network infrastructure and protocol and collects data across the network for third party applications or locally hosted software applications. In most modern systems the gateway simply packages the data as IPv4 and sends it to the cloud. This data is usually handled and collected by using a message broker. The message broker most commonly used is called MQTT and there are variations from cloud solutions vendors such as Google PubSub or AWS Lambda. The broker collects messages that are received and stored in a que, and then publish those messages to a destination in the cloud. The gateway hardware is often proprietary to the network vendor and is a substantial part of their revenue model. Effectively, the end user is prevented from accessing the network without the vendors proprietary gateway device. This is very commonly seen throughout home automation solutions or building automation solutions, which only devices that are compatible with the hardware gateway provided can be used in the network. Even if the devices are supposedly based on standards protocols.

Due to the flexible requirement for a network configured as described herein to be completely private or isolated from the internet, a software based gateway service can be implemented. Such a software defined gateway can actually be downloaded onto any kind of computing hardware or operating system, including very low powered single board computers. The service can, e.g., be published and downloaded through a popular software management platform called NPM. If the service is installed on a your computer (it can be windows, mac, linux, rasbpian etc., as long as is has the Node and NPM packages also installed on your computer) then the computer, effectively becomes a network gateway and can be configured as a sink, by simply installing a USB router hardware on that computer. The software will automatically recognize the USB router and activate the gateway service to receive messages.

The messages will not be stored in a que, then will simply come into the server log as they are received across the network and then disappear.

The gateway software is highly configurable, such that a software developer or user can define what to do with the messages. All sensor messages can come into the server abstracted as JSON packages. This means that each sensor message payload and attributes, include meta data like sensor type, timestamp received at the gateway, dozens of configurable log outputs as well as the sensor payload in human readable form are directly output from the message. This makes integration with database and software applications very fast and simple. A software developer can even directly print the sensor data to a web URL or website field or a locally hosted application on the same machine.

The gateway software can also be used to send commands to the network to change configuration parameters, such as the network baud rate for RS485 drivers, temperature scale reading, and various bits of meta information for measuring network performance such as number of hops the message took during its route or Signal Strength (RSSI) value from the sensor to the router. Configuration commands need certain authorization level to execute and in some special cases there can be human intervention to authorize through the use of "hardware key" or password protected access.

It is also possible to turn off the JSON abstraction and read the raw code.

The user is not locked into a piece of proprietary hardware, anyone who downloads the application can run it on a generic computer and write software to interface with the network data. This also adds to the theme of a removal of central authority. The Node software is built on an Open Source platform so that software developers can build and publish new modules and applications that could be freely downloaded and run on the lower level gateway server. For example, a sensor management software, a blockchain authentication software, a data analysis software or any one of thousands of existing APIs and software which use RESTful callback functions can be integrated with the Conectric Server.js.

In certain embodiments, sensor payload can be cryptographically encrypted at the gateway sink, collected and injected into a blockchain software with unencrypted accompanying meta data. Each sensor in the network can thus be bound to a wallet ID, using a similar fashion as described above, to permanently and immutably mate the sensor and the network. The data can reside in the blockchain token that is being held by a token wallet. Using the blockchain explorer software, a user could search and view meta data about the accompanying data that contains actual sensor data payload if unencrypted, the corresponding sensor wallet, date and time ranges of the encrypted data, sensor types, etc. This way large amounts of sensor data can be anonymized by only being identifiable with the wallet with which it is associated and the data can be confirmed as authentic.

In another embodiment the sensor payload data can reside in an edge gateway with one or more database's installed locally, with such database's secured as to prevent access, such that the sensor payload data can be stored until such time the database is instructed to pass the data to a second database, a remote database, or embedded within a blockchain transaction record. In the case the data is transferred from the database to a blockchain transaction record, the blockchain node may reside locally with the edge gateway as a full blockchain node, in which the natural sync activity of the node would record the sensor data transaction which took place initially within the edge gateway. Such a transaction could take place if the edge gateway was represented by a blockchain wallet in which an electronic or cryptographic token were received by the blockchain wallet initiating the data transfer from the local database to the secondary database, remote database or recordation of the data payload within the blockchain node.

In yet another embodiment, multiple participants in the form of sensor ID's and blockchain wallets transact within a lighting network locally operating at the gateway node level, which are a form of lightweight blockchain software for the purpose of recording a very high throughput and volume of transactions in which the transactions are confirmed locally before requiring validation from network participants across the network. In such an example the sensor data payload may be recorded within a lighting network channel transaction between two or more sensors, or two or more wallet ID's, in which the transactions are locally validated based on a consensus algorithm, based on historical behavior or knowledge of the related sensor or wallet ID's, or by operating a local mining system only responsible for securing and validating transactions within the edge node rather than requiring multiple confirmations across the entire master network (sometimes referred to as the "mainnet"). It should be possible to periodically add the historical transaction record of the lighting network in the edge gateway to the mainnet, for example when a transaction channel between two or more sensors or wallet ID's is closed, at a regular timed interval or based on a specific event or instruction issued by one or more sensors, wallet ID's or edge gateway database's.

This provides software developers and data analytics vendors with huge amounts of data access they could never otherwise obtain from proprietary vendor ecosystems (Google, Apple, Amazon etc.). The value of the data would be very high as its quality and originality would be validated by the blockchain record. An analytics service can then purchase "empty" tokens without data but some monetary value, to exchange the wallet holder with the data filled tokens or initiate an instruction to release the data contained in the edge database or lighting blockchain network. The wallet holder would provide the data purchaser with the private key needed to unencrypt the data payload and view the entire data collection according to functions derived in a smart contract.

In yet another embodiment the data purchaser has a previously issued key, which allows them to decrypt the data requested, such that only those holders of issued keys are able to decrypt data which has been sent to them, or to the blockchain mainnet by the edge gateway.

This creates a meta sensor data marketplace that solves security, privacy and data quality issues. It can enable a large ecosystem of app developers (Google Play/iTunes) to develop apps based on the data and offer services to the sensor owner wallet that provided the data. The sensor wallet owner could purchase the services in kind with more data tokens or with non-data tokens and compensate the app developer for their services. Virtually unlimited number of applications can be created to deliver value to sensor owners, who could also be compensated for feeding data into the system and providing them a return on their sensor investment. It would be possible to monetize the apps, services, sensors, sensor data and marketplace. Because of the unique nature of the network, even private sensor network data could be unlocked later using hardware or software keys.

Figure 2:
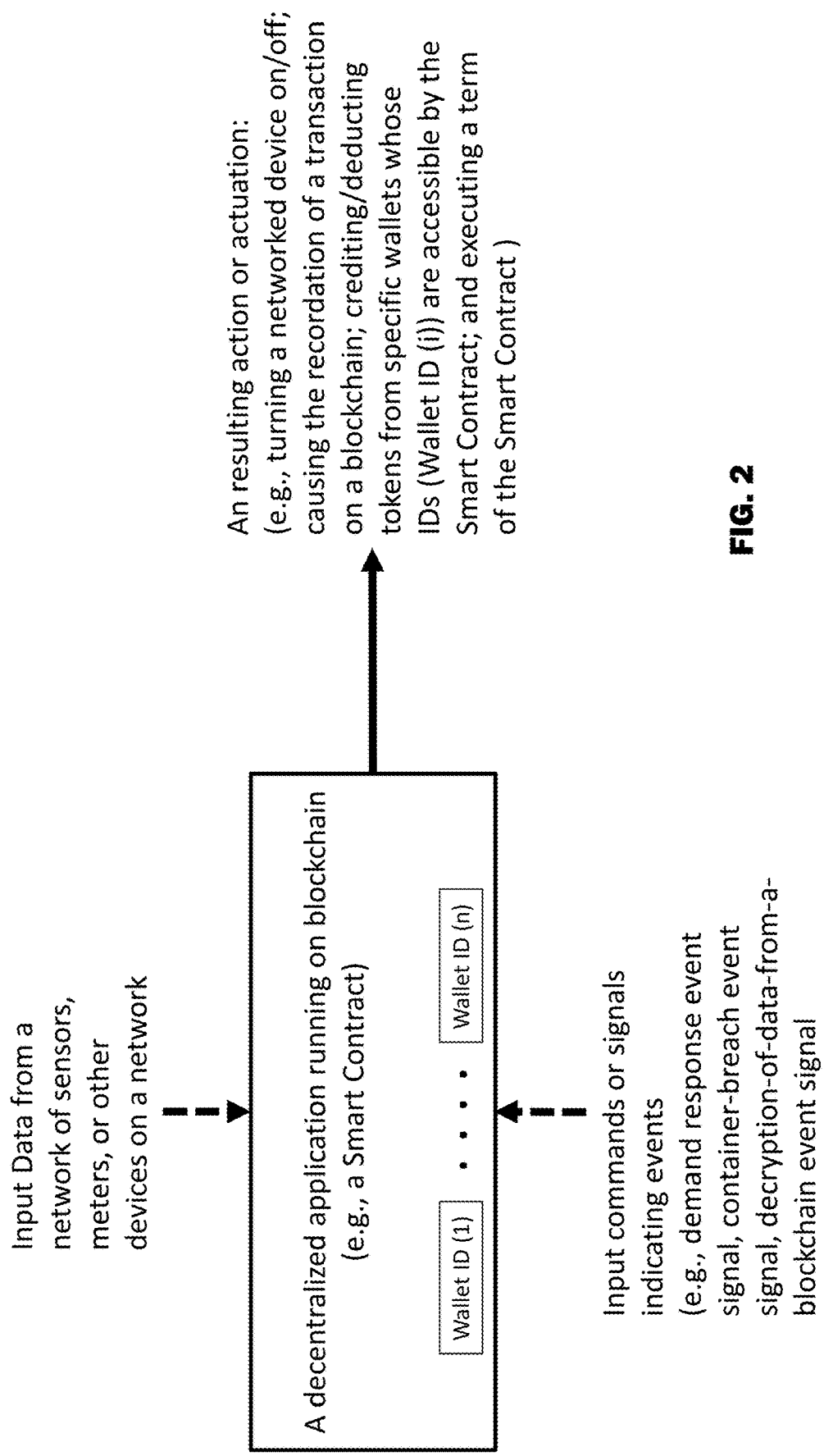
FIG. 2 is a diagram illustrating an example decentralized application according to one embodiment.
Figure 5:
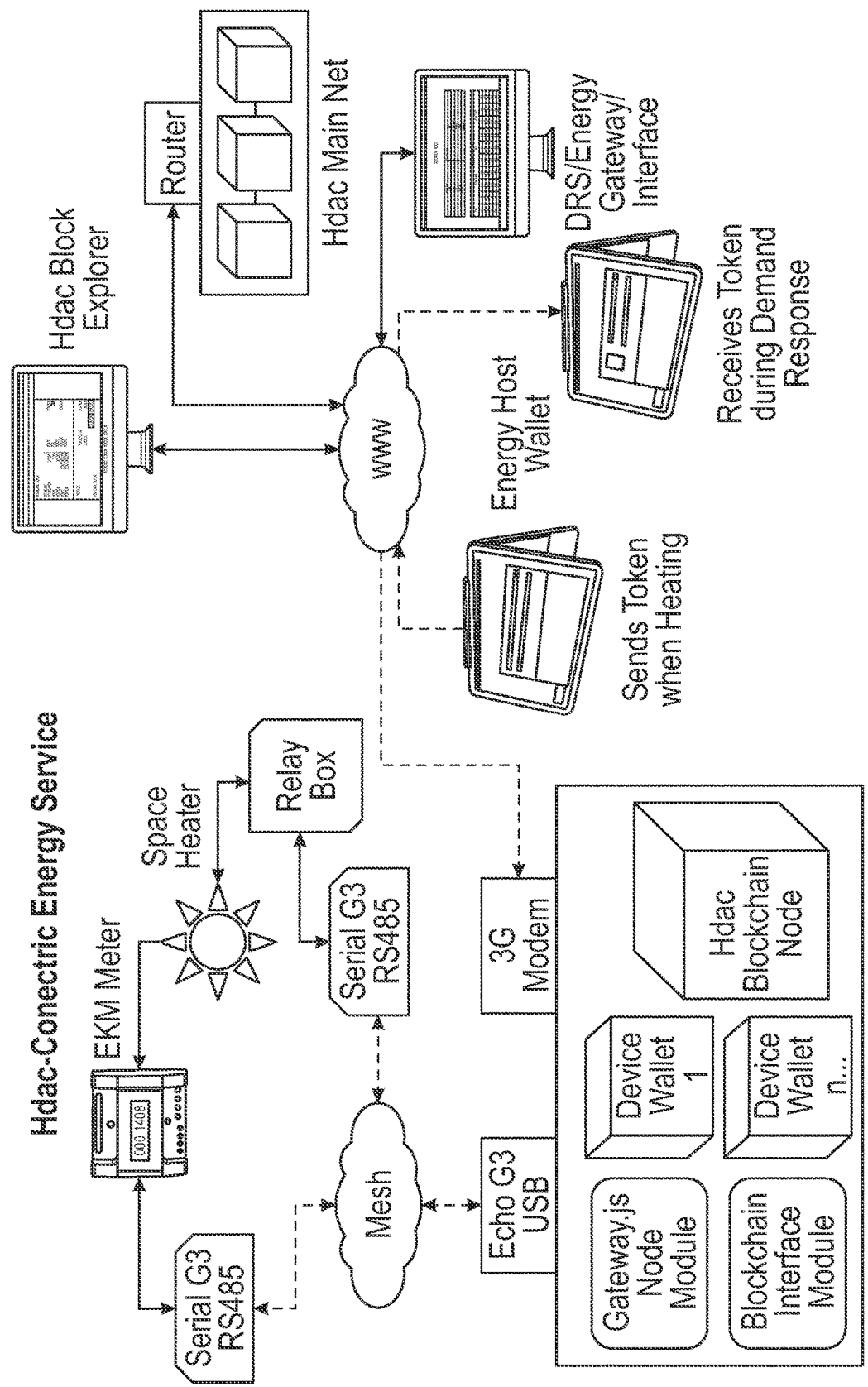
FIG. 5 is a diagram illustrating an example demand response event signal according to one embodiment.

As illustrated in FIG. 2, A decentralized application, or a smart contract, is a software program that accesses data recorded in a blockchain, accesses stored information for example such as Wallet IDs corresponding to data blocks in a blockchain, i.e., "wallets". The smart contract can access data from a network of devices, e.g., a mesh network, of networked sensors, meters, or other devices on the network as described above. For example, this mesh network of sensors and devices may be located in a building (FIG. 5), in a ship, truck, or train, or in a terminal (FIG. 6), depending on the particular application.

Another possible type of input data to the smart contract are commands or signals indicating events, such as demand response event signals, container-breach-event signal, or signals indicating the event of decryption of data in a blockchain. Demand response event signal is related to the "Hdac-Conectric Energy Service" embodiment shown in FIG. 5. Container-breach-event signal is related to the "Hdac-Conectric Logistics Monitor" embodiment shown in FIG. 6. Decryption-of-data-from a blockchain event signal is related to the "Hdac-Conectric IoT Data Market" embodiment shown in FIG. 7.

Based on processing its inputs, the smart contract implements a resulting action or performs an actuation, e.g., turning a networked device on/off; causing the recordation of a transaction on a blockchain; crediting/deducting tokens from specific wallets; or executing a term of the Smart Contract.

Figure 3:
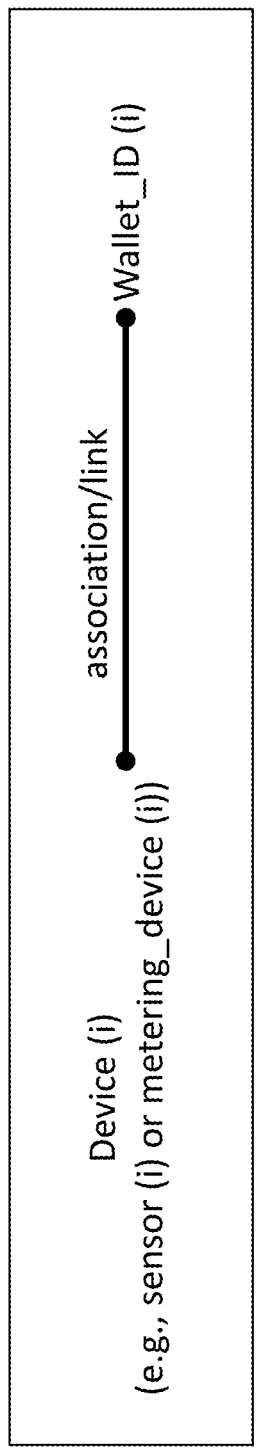
FIG. 3 is a diagram illustrating an example Wallet_ID according to one embodiment.

In certain embodiments, every device on the mesh network, such as a sensor, or a metering device is associated/linked with a specific device wallet on a blockchain which is uniquely identified with a Wallet_ID, as depicted in FIG. 3. The i'th device on the network, where i=1, 2, . . . , n, is linked with a unique identifier Wallet_ID (i) which is typically composed of 32 alphanumeric characters and 4 dashes. In some implementations, the identifier of the network can also be included in addition to sensor identification in order to immutably mate the sensor and the network and bind them with a Wallet.

Figure 4:
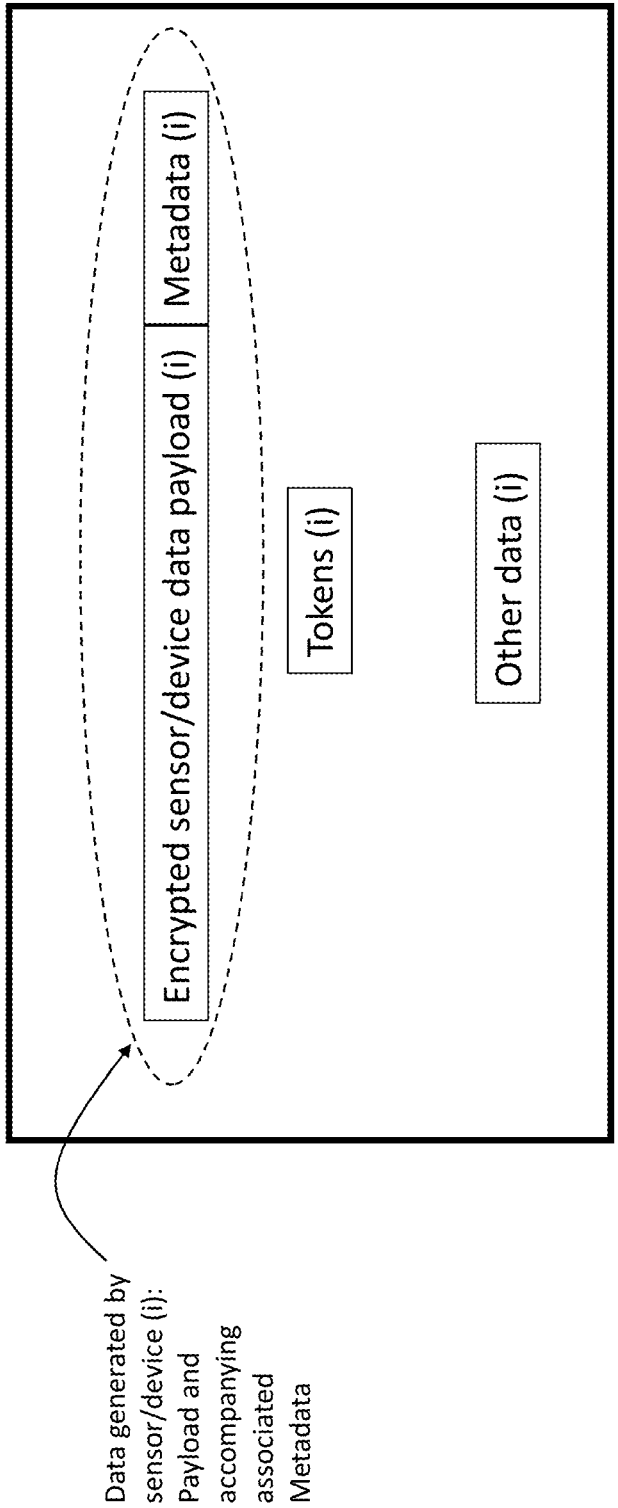
FIG. 4 is a diagram illustrating an example typical contents of a wallet associated with a sensor/device according to one embodiment.

FIG. 4 shows typical contents of a wallet associated with a sensor/device, say the i'th sensor/device, with the identifier Wallet_ID (i), according to the invention. A wallet comprises data collected by the sensor (i) or data measured by a metering device (i), i.e., the payload, which is typically encrypted, as well as the metadata associated with the sensor/device (i) and its payload; tokens credited to the sensor/device (i); and any other data that may be related to the sensor/device (i). Metadata may include date/time ranges of the payload data, the type of the sensor, the time frequency of samples, etc.

The tokens in the wallet may be credited (i.e., incremented) or deducted based on actions initiated by the Smart Contract as described in reference to FIG. 2. Credits and deductions of tokens are described in specific embodiments on slides titled "Hdac-Conectric Energy Service" (FIG. 5), Hdac-Conectric Logistics Monitor" (FIG. 6), and "Hdac-Conectric IoT Data Market" (FIG. 7).

Figure 6:
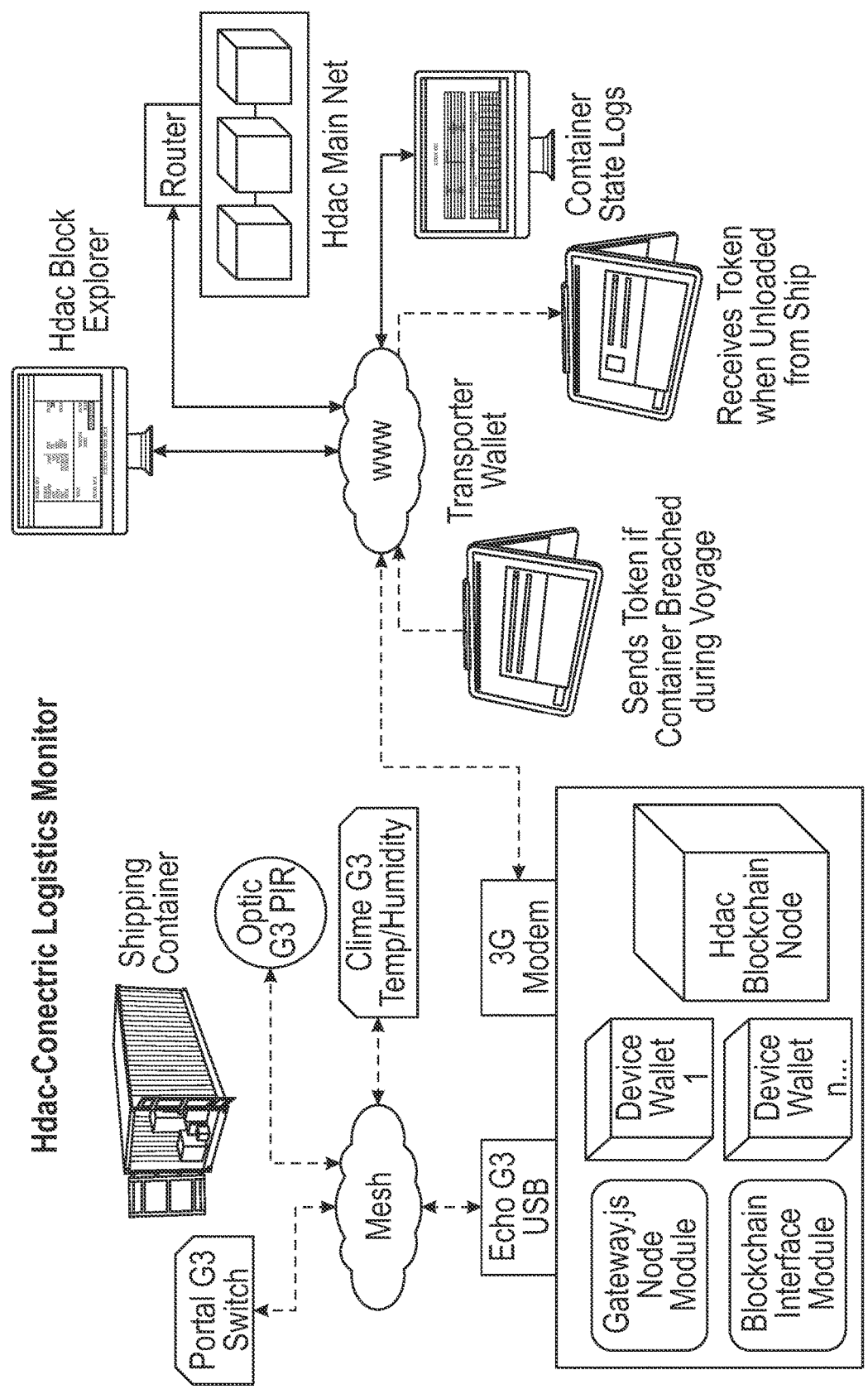
FIG. 6 is a diagram illustrating an example container-breach-event signal according to one embodiment.

Alternatively, wallets can be associated with an individual or an entity such as an analytics service provider, e.g., "Analyst Wallet" as shown in the slide titled "Hdac-Conectric IoT Data Market" (FIG. 7), or a transportation service provider, e.g., a "Transporter Wallet", as shown in the slide titled "Hdac-Conectric Logistics Monitor" (FIG. 6).

Figure 7:
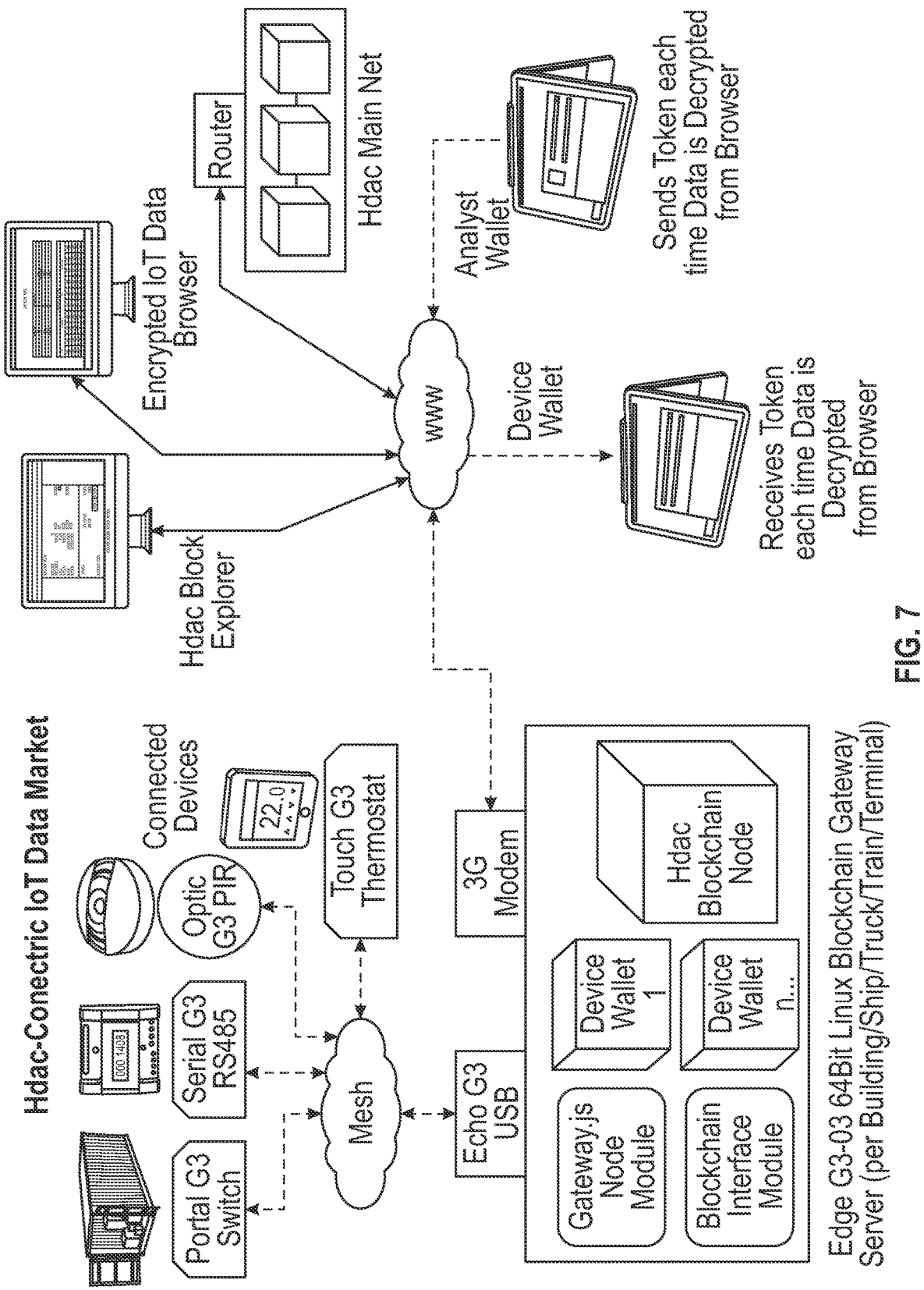
FIG. 7 is a diagram illustrating an example data marketplace based on a blockchain implementation according to one embodiment.

FIG. 7 shows the proposed concept of a data marketplace based on a blockchain implementation enabled by the proposed solution. A mesh network of sensors may include switch sensors sensing for example the opening (e.g., breaching) of a shipping container, an occupancy sensor such as an optical passive IR sensor, a thermostat, or an electric metering device. Potential customers of the sensor/device data on the blockchain can search or browse the (unencrypted) metadata associated with the available sensor/device payload data on the blockchain using the "Encrypted IoT Data Browser" which essentially allows the exploring of the blockchain data without having access to the sensor/device payload but only by using the associated metadata.

The customer or the consumer of the payload data (e.g., an analytics service provider) has to compensate the data owner in order to have access to the private decryption key in order to decrypt and access the payload data. As shown in FIG. 7, the Analyst Wallet sends a token to the device or data owner wallet each time data is decrypted and accessed by a customer. For example, a decentralized application or a smart contract causes deduction and crediting of tokens in respective wallets. The debit and credit transactions can be witnessed/visualized using for example an Android Wallet Application as shown in FIG. 8.

In some implementations, the results of the data analysis and inference performed on the data can also be recorded on the blockchain for access by parties who has rightful access provisions.

In some implementations, decryption key may be implemented using the Hardware Key (as described in the below in connection with FIG. 9) which necessitates the physical presence of the hardware key. The advantage of this particular implementation for the data owner is that the decryption can be controlled and becomes available only to those who possess the specific hardware key. In this manner, the data owner may be compensated multiple times, e.g., via tokens, for the same set of data by different customers.

Figure 8:
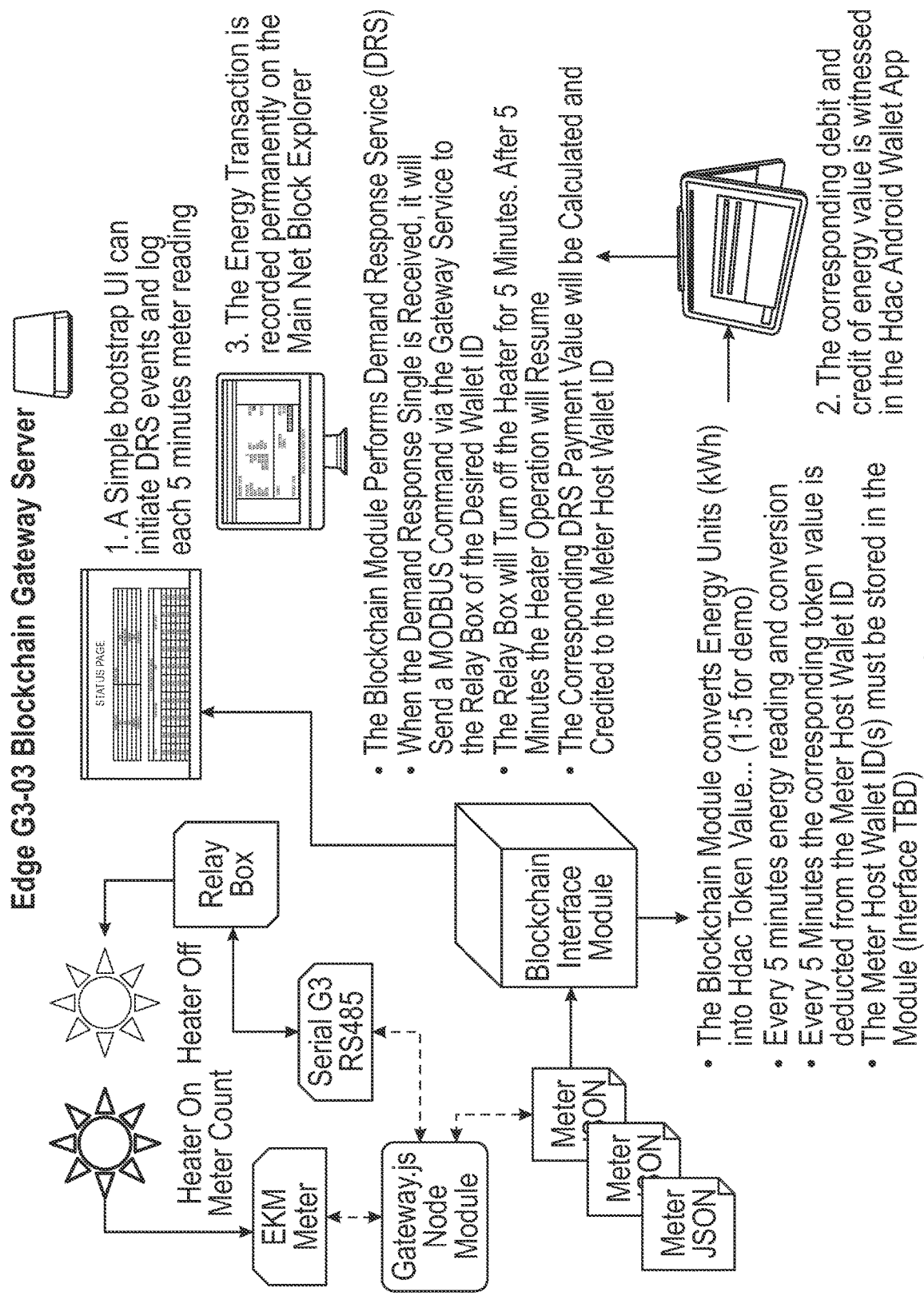
FIG. 8 is a diagram illustrating an example blockchain-based energy monitoring as part of a blockchain-based Demand Response Service (DRS) according to one embodiment.

FIG. 8 shows the main steps of an example of a blockchain-based energy monitoring as part of a blockchain-based Demand Response Service (DRS). In FIGS. 5, 6, 7, and 8, the Block Explorer accesses the clear (unencrypted) data on the blockchain, such as the metadata, to provide search and browsing capability, or capability for advertising the availability of certain data on the blockchain.

Figure 9:
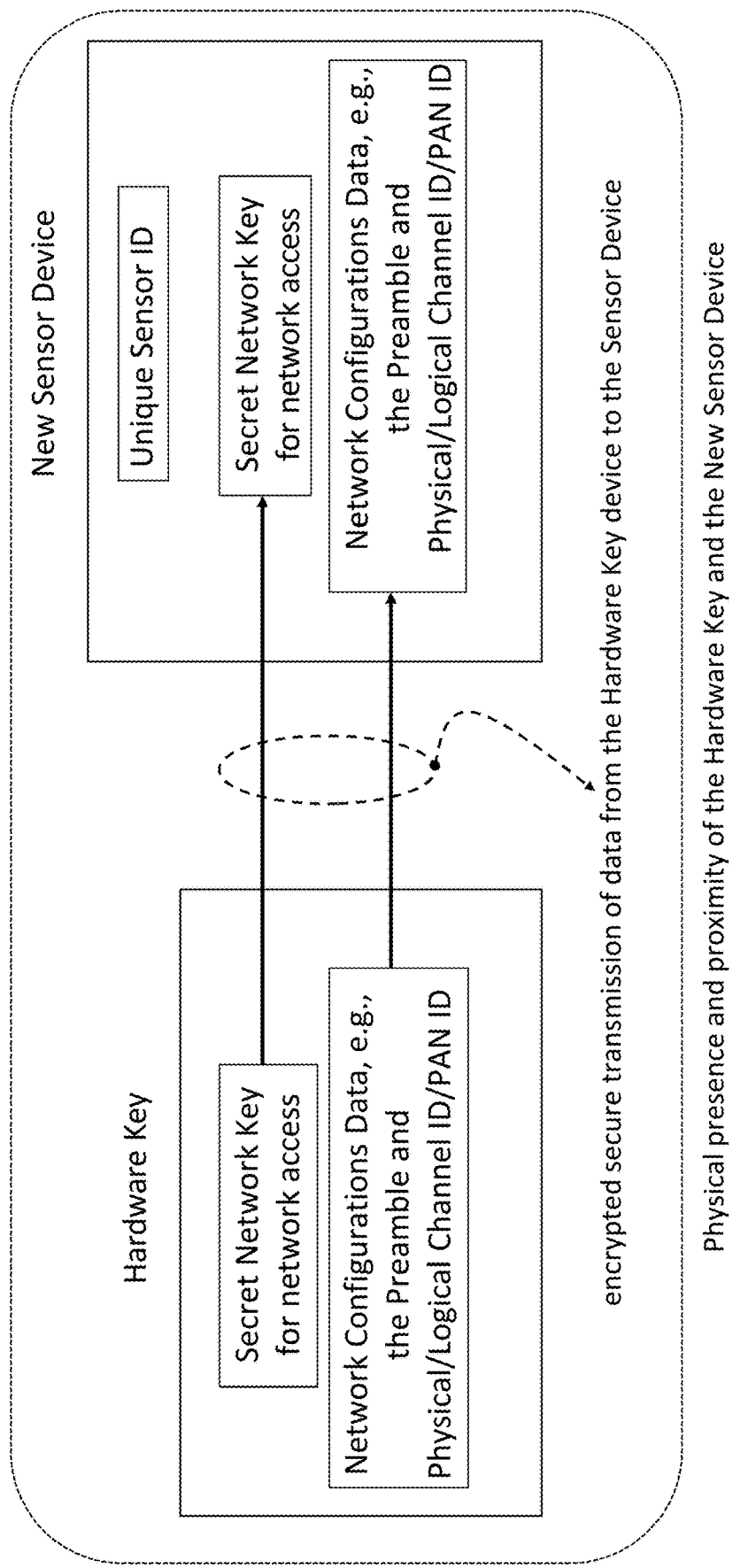
FIG. 9 is a diagram illustrating an example decryption key implemented using the Hardware Key according to one embodiment.

The hardware key concept described herein is a solution for addressing the security problems with the proposed open network and its decentralized management and operation. The Hardware Key and its data contents that are transferred to a new sensor that is desired to be added to the network, when the new sensor is in physical proximity of the Hardware Key, is depicted in FIG. 9. The Hardware key may be a node in the network. Physical presence and physical proximity with the Hardware Key is required for a new sensor to be successfully admitted to the network and become operational on the network. The secret Network Key and the Network Configurations data will be software configured in the sensor device once they are received at the new sensor device. The secret Network Key will enable the new sensor device gain access to the network and the network configuration information will enable the new sensor device to transmit and receive information on the network.

The sensor device is identified by its unique identifier that is stored in the sensor device during its manufacturing/production.

In some implementations, to add an additional layer of security, the secret Network Key can be stored in a write-once-only type of memory in the sensor device thereby permanently binding the sensor device to the particular network. In some implementations, the contents of the Hardware Key may be stored in a mobile device such as a smartphone or a tablet, e.g., in the form of a commissioning application.

Figure 10:
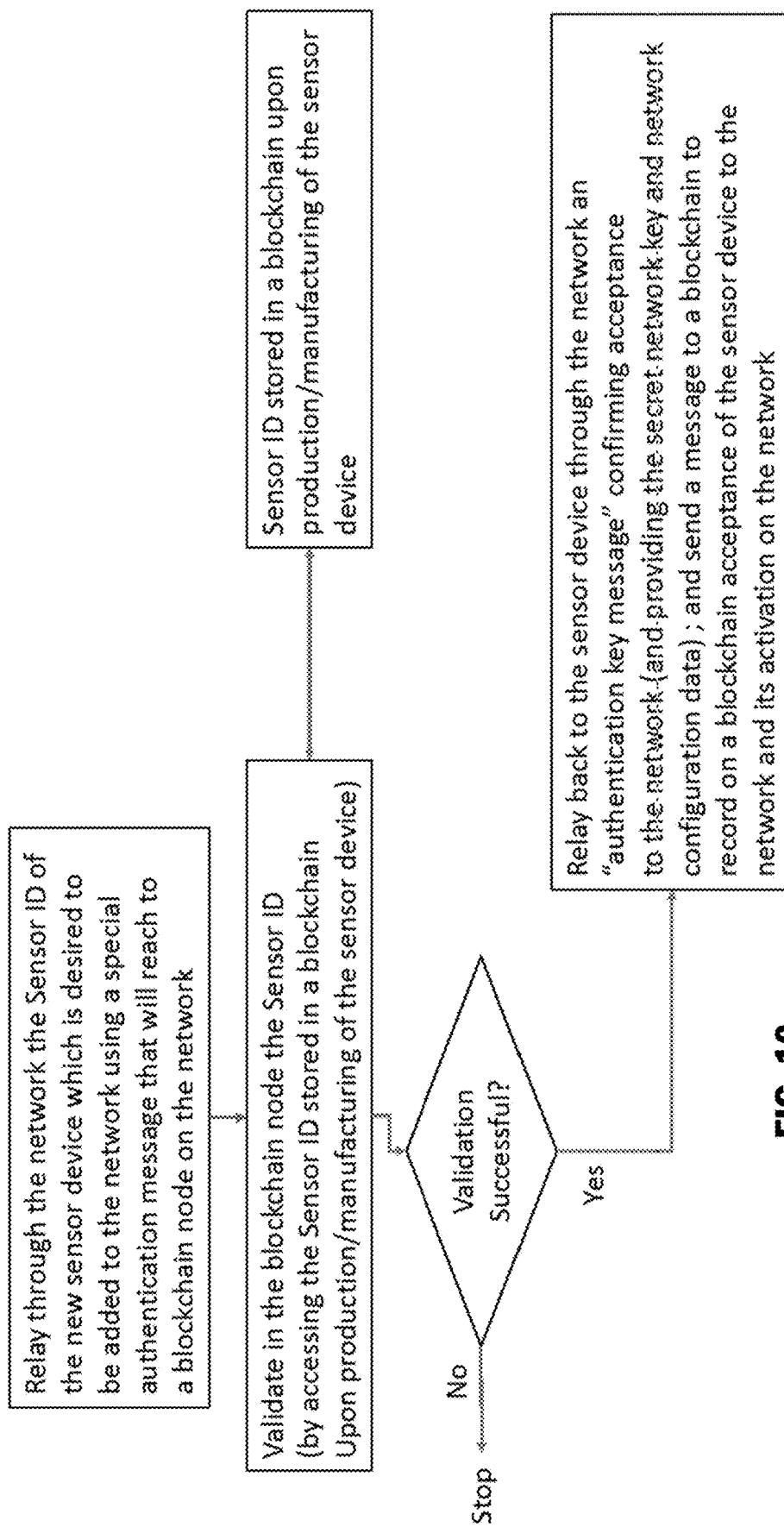
FIG. 10 is a diagram illustrating an example blockchain-based, autonomous authentication and validation used as an alternative (or in addition) to the hardware key and the requirement for physical proximity and presence according to one embodiment.

In some implementations, a blockchain-based, autonomous authentication and validation may be used as an alternative (or in addition) to the hardware key and the requirement for physical proximity and presence. This is depicted in FIG. 10. The "authentication message" mentioned in FIG. 10 is an encrypted message where encryption may be according to public key encryption (PKE). A public key of the sensor device can possibly be stored in a blockchain and be available to the public, especially in the case of the alternative blockchain based implementation.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A method for operating a wireless sensor network comprising:
   detecting a first condition at a first sensor device of the wireless sensor network;
   transmitting, by the first sensor device, data regarding the first condition to the wireless sensor network;
   detecting a second condition at a second sensor device of the wireless sensor network;
   transmitting, by the second sensor device, data regarding the second condition to the wireless sensor network;
   detecting a third condition at a third sensor device of the wireless sensor network, wherein the first sensor device, the second sensor device, and the third sensor device operate within a logical channel;
   receiving, at the third sensor device, the first data and the second data;
   determining, at the third sensor device, that the first data and the second data include a Private Area Network (PAN) ID associated with a grouping of sensors;
   based on the determination, transmitting, by the third sensor device, the first data and the second data to the wireless sensor network;
   detecting, by the third sensor device, a fourth sensor device;
   determining, by the third sensor device, that the fourth sensor device operates in the logical channel;
   based on the determination, accepting, by the third sensor device, the fourth sensor device into the wireless sensor network;
   determining, by the third sensor device, that a software revision is available at the fourth sensor device;
   receiving, by the third sensor device, the software revision from the fourth sensor device;
   store, by the third sensor device, the software revision in flash memory for a duration of time;
   transmitting, by the third sensor device, the software revision to the wireless sensor network after the duration of time;
   transmitting the third data to the wireless sensor network;
   receiving, at a gateway, the first data, the second data, and the third data; and
   storing, by the gateway, the first data, the second data, and the third data in a cloud-based storage memory.

2. The method of claim 1, wherein the grouping of sensors comprises a type of sensor.

3. The method of claim 1, wherein the grouping of sensors comprises sensors within a geographic area.

4. A wireless sensor network comprising:
   a first sensor device operable to
      detect a first condition, and
      transmit data regarding the first condition to the wireless sensor network via any currently available sensor in range of the first sensor device;
   a second sensor device operable to
      detect a second condition, and
      transmit data regarding the second condition to the wireless sensor network via any currently available sensor in range of the second sensor device;
   a third sensor device, including a gateway list, wherein the first sensor device, the second sensor device, and the third sensor device operate within a logical channel, the third sensor device being operable to
   detect a third condition,
   periodically update the gateway list;
   receive the first data and the second data,
   transmit the first data, the second data, and the third data to a gateway on the gateway list;
   detect a fourth sensor device;
   determine that the fourth sensor device operates in the logical channel;
   based on the determination, accept the fourth sensor device into the wireless sensor network;
   determine that a software revision is available at the fourth sensor device;
   receive the software revision from the fourth sensor device;
   store the software revision in flash memory for a duration of time; and
   transmit the software revision to the wireless sensor network after the duration of time; and
   the gateway operable to
      receive, the first data, the second data, and the third data, and
      store the first data, the second data, and the third data in a cloud-based storage memory.

5. The wireless sensor network of claim 4, wherein the first sensor device and the second sensor device are associated with a first cluster, wherein transmitting the data regarding the first condition comprises transmitting a first communication stack comprising a Private Area Network (PAN) ID associated with the first cluster, and wherein transmitting the data regarding the second condition comprises transmitting a second communication stack comprising the PAN ID associated with the first cluster.

6. The wireless sensor network of claim 5, wherein the third sensor is further operable to receive the first communication stack and the second communication stack, identify the PAN ID associated with the first cluster in the first communication stack and the second communication stack, and to transmit the data regarding the first condition and the data regarding the second condition based on the identification of the PAN ID.

* * * * *